(12) United States Patent
Johnson et al.

(10) Patent No.: US 11,655,912 B2
(45) Date of Patent: May 23, 2023

(54) BELLOWS DIAPHRAGM ASSEMBLY

(71) Applicant: Proterial, Ltd., Tokyo (JP)

(72) Inventors: Ryan Johnson, Fort Collins, CO (US); Ken Kawakami, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 17/149,616

(22) Filed: Jan. 14, 2021

(65) Prior Publication Data

US 2022/0221082 A1 Jul. 14, 2022

(51) Int. Cl.
*F16K 41/10* (2006.01)
*F16K 31/44* (2006.01)
*G05D 7/06* (2006.01)
*G05D 7/01* (2006.01)

(52) U.S. Cl.
CPC .............. *F16K 41/10* (2013.01); *F16K 31/44* (2013.01); *G05D 7/0635* (2013.01); *G05D 7/0113* (2013.01)

(58) Field of Classification Search
CPC ....... F16K 41/10; F16K 31/44; G05D 7/0635; G05D 7/0113
USPC ........... 137/455, 487.5, 505.36, 510; 251/45, 251/61.1, 129.17, 331, 335.3
See application file for complete search history.

(56) References Cited

U.S. PATENT DOCUMENTS

| | | | | |
|---|---|---|---|---|
| 4,556,193 A | * | 12/1985 | Yoshiga | F25B 41/35 251/248 |
| 4,796,854 A | * | 1/1989 | Ewing | F16K 31/0693 251/282 |
| 4,813,647 A | * | 3/1989 | Yagi | F02M 3/075 251/129.05 |
| 4,995,589 A | * | 2/1991 | Adishian | F16K 31/1221 251/63.5 |
| 5,165,652 A | * | 11/1992 | Nicolaisen | H01F 7/1638 251/129.17 |
| 5,239,223 A | * | 8/1993 | Miyoshi | H01L 41/0536 310/340 |
| 5,678,803 A | * | 10/1997 | Shinohara | F16K 41/12 251/368 |

(Continued)

FOREIGN PATENT DOCUMENTS

| | | |
|---|---|---|
| JP | 200684004 A | 3/2006 |
| JP | 202056430 A | 4/2020 |
| WO | 2020066727 A1 | 4/2020 |

OTHER PUBLICATIONS

Maki, Hajime, International Search Report, Japan Patent Office, dated Feb. 22, 2022.

*Primary Examiner* — Minh Q Le
(74) *Attorney, Agent, or Firm* — Neugeboren O'Dowd PC

(57) ABSTRACT

A diaphragm assembly for a mass flow controller is disclosed. The diaphragm assembly includes an aperture, side walls extending from the aperture and disposed about a central axis, the side walls including multiple convolutions, and a poppet including an interior surface facing the aperture and exterior sealing surface. At least a portion of the diaphragm assembly moveable extends and retracts within a control valve cavity of the mass flow controller. A push rod extending from the interior surface of the poppet moves, responsive to an actuator of the mass flow controller, to enable the exterior sealing surface of the poppet to open and close a flow path through the control valve cavity.

15 Claims, 9 Drawing Sheets

(56) References Cited

U.S. PATENT DOCUMENTS

| | | | | |
|---|---|---|---|---|
| 5,772,181 | A | * | 6/1998 | Robertson, III ........ F16K 31/10 251/234 |
| 5,897,096 | A | * | 4/1999 | Nakano ................ F16K 41/103 251/65 |
| 5,915,410 | A | * | 6/1999 | Zajac ...................... F16K 1/54 137/341 |
| 6,247,493 | B1 | * | 6/2001 | Henderson ........... G05D 7/0641 137/12 |
| 6,289,737 | B1 | | 9/2001 | Kouketsu et al. |
| 6,305,665 | B1 | * | 10/2001 | Coura ................... F16K 41/103 251/319 |
| 8,033,525 | B2 | * | 10/2011 | Wingett ................ F16K 1/523 251/285 |
| 2009/0272924 | A1 | * | 11/2009 | Wingett ................ F16K 41/10 251/363 |
| 2010/0193056 | A1 | * | 8/2010 | Igarashi ............... G05D 7/0635 137/613 |
| 2012/0001102 | A1 | * | 1/2012 | Chiba ................... F16K 41/10 251/11 |
| 2012/0318383 | A1 | * | 12/2012 | Yasuda .................... G01F 1/36 73/204.25 |
| 2014/0326909 | A1 | | 11/2014 | Ding et al. |
| 2017/0370497 | A1 | * | 12/2017 | John ........................ F16K 1/12 |
| 2019/0138033 | A1 | | 5/2019 | Sawachi et al. |

\* cited by examiner

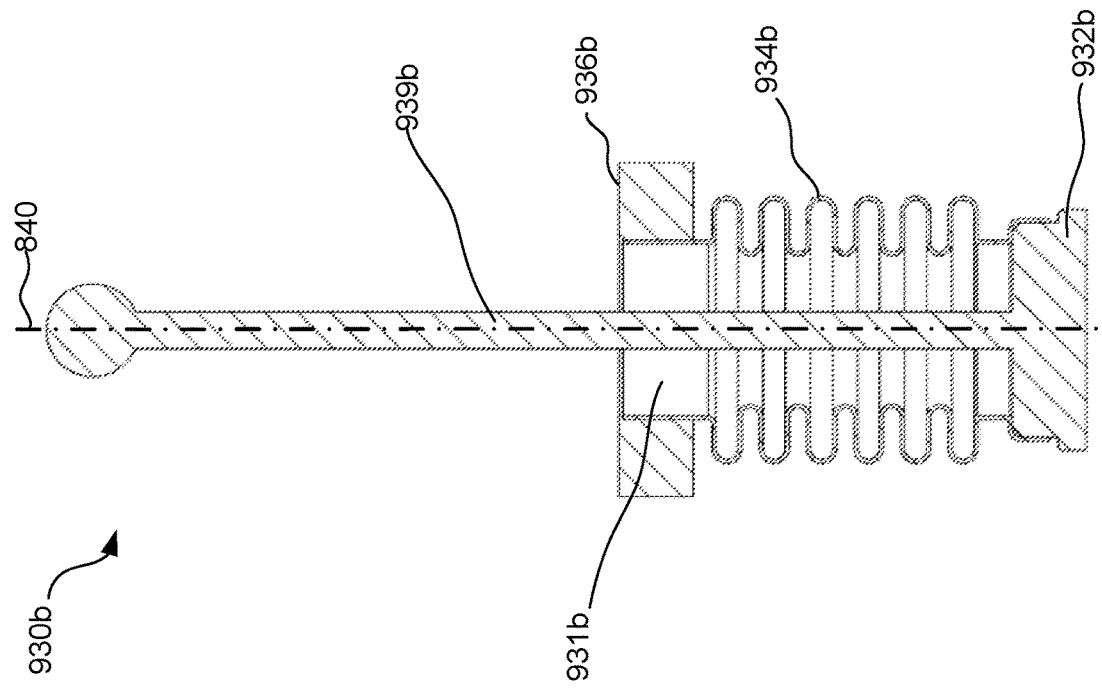
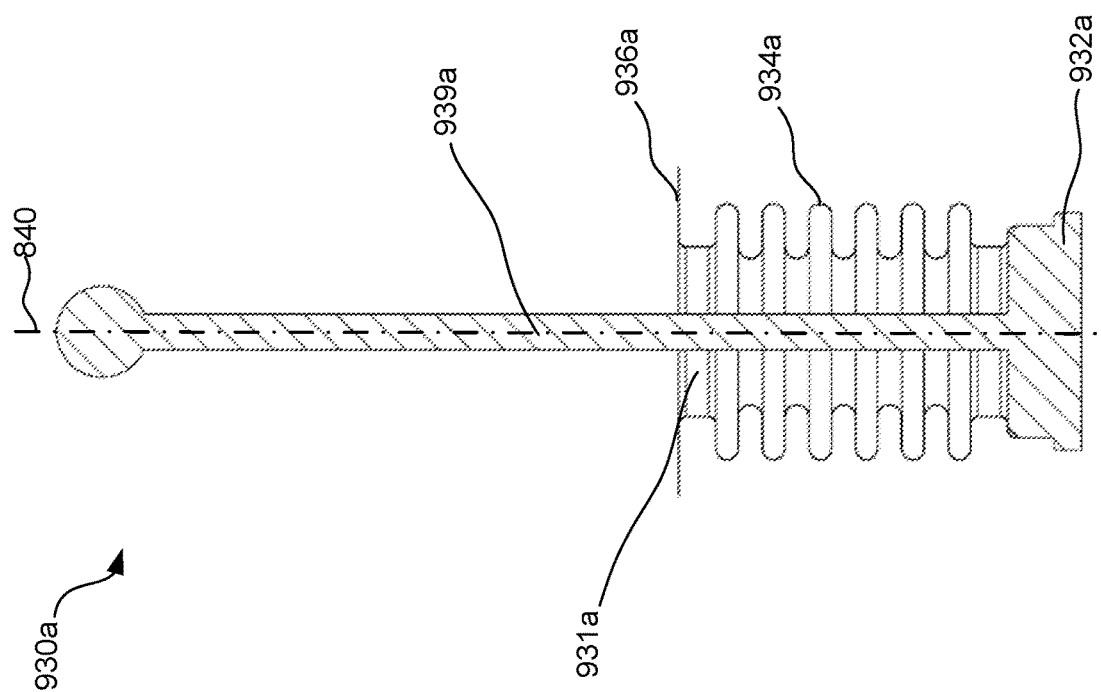

BELLOWS DIAPHRAGM ASSEMBLY

BACKGROUND

Field

The present disclosed embodiments relate generally to systems and methods for mass flow control, and more specifically to diaphragms of mass flow controllers.

Background

Mass flow controllers are used to regulate a mass flow rate of a fluid to a desired location. For example, some mass flow controllers precisely regulate mass flow rates in environments where a processing gas is delivered to a processing application, such as in a plasma processing system. Such mass flow controllers often utilize deflections of a diaphragm along the flow path of the gas, also known as the "wetted path," in regulating the mass flow rate.

Mass flow controller diaphragms often comprise a circular, thin metal sheet, typically 25 mm or larger in diameter, which may allow for large deflections (e.g., 60-100 microns); however, mass flow controllers with smaller footprints require smaller diameter diaphragms, which may not allow for the large deflections necessary for certain applications.

There is a growing demand for such smaller-footprint mass flow controllers, and there is therefore a need in the art for a new diaphragm design that addresses some of the current shortcomings, particularly those involved in maintaining a large deflection capability in smaller diameter diaphragms.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects associated with to the mechanisms disclosed herein in a simplified form to precede the detailed description presented below.

Some aspects of the present disclosure may be characterized as a mass flow controller with a flow path including a control valve cavity including a control valve cavity inlet port and a control valve cavity outlet port. The mass flow controller includes a mass flow meter configured to measure a mass flow rate of a gas flowing through the gas flow path, a controller configured to provide an actuator control signal responsive to a mass-flow-rate signal from the mass flow meter, and an actuator configured to move in response to the actuator control signal. The mass flow controller further includes a diaphragm assembly configured so at least a portion of the diaphragm assembly moveably extends and retracts within the control valve cavity. The diaphragm assembly includes an aperture, side walls extending from the aperture and disposed about a central axis, the side walls including multiple convolutions, and a poppet including an interior surface facing the aperture and exterior sealing surface facing the control valve cavity inlet port. A push rod may extend from the interior surface of the poppet, along the central axis, through the aperture to enable the push rod to couple to the actuator. The push rod may move, responsive to motion of the actuator, along the central axis to enable the exterior sealing surface of the poppet to open and close the flow path through the control valve cavity.

Other aspects of the present disclosure may be characterized as a mass flow controller with a flow path including a control valve cavity including a control valve cavity inlet port and a control valve cavity outlet port. The mass flow controller may include a mass flow meter configured to measure a mass flow rate of a gas flowing through the gas flow path, a controller configured to provide an actuator control signal responsive to a mass-flow-rate signal from the mass flow meter, and an actuator configured to move in response to the actuator control signal. The mass flow controller may further include a diaphragm assembly, which may include means for sealing the control valve cavity apart from the actuator, means for opening and closing the flow path through the control valve cavity, and bellows coupled between the means for sealing and the means for opening. A push rod may couple the diaphragm assembly to the actuator so the diaphragm assembly moves in response to the actuator.

BRIEF DESCRIPTION OF THE DRAWINGS

FIG. 9A illustrates a cross-sectional view of an exemplary embodiment of a diaphragm assembly having an integrated push rod and a formed flanged top surface; and FIG. 9B illustrates a cross-sectional view of an exemplary embodiment of a diaphragm assembly having an integrated push rod and a separately-coupled flanged top surface.

DETAILED DESCRIPTION

Figure 1:
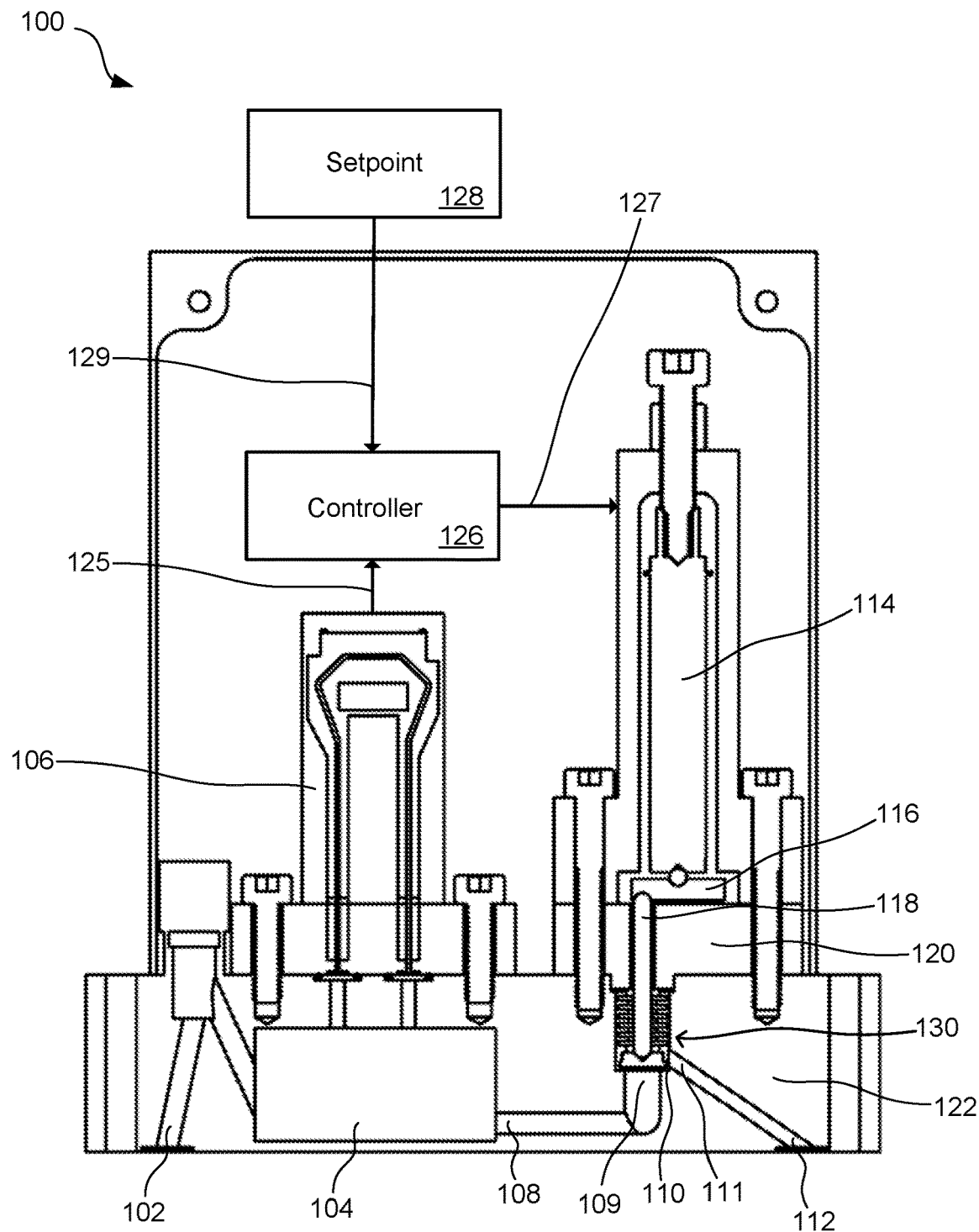
FIG. 1 illustrates a cross-sectional view of an exemplary embodiment of a mass flow controller with a diaphragm assembly.

The word "exemplary" is used herein to mean "serving as an example, instance, or illustration." Any embodiment described herein as "exemplary" is not necessarily to be construed as preferred or advantageous over other embodiments.

The present disclosure may enable a small diameter diaphragm (e.g., 7-9 mm) of a mass flow controller to potentially have a large deflection capability (e.g., 40-60 microns), which may allow for mass flow control at higher flow rates (e.g., 20 standard liters per minute (SLM)) than previously possible. Additionally, the present disclosure may enable the removal of certain typical mass flow controller components, such as a spring and push rod of a typical control valve assembly, from the wetted path, potentially preventing corrosion or other degradation of such components associated with gas exposure. Furthermore, the present disclosure may enable a control valve assembly of a mass flow controller to operate without the need of springs conventionally associated with control valves. By implementing the apparatuses of the present disclosure, significant improvements in mass flow controllers may be obtained, potentially enabling more reliable mass flow controllers with smaller footprints.

Some embodiments of the present disclosure may comprise a mass flow controller having a flow path including a control valve cavity with an inlet and outlet port. The mass flow controller may further comprise a mass flow meter configured to measure a mass flow rate of a gas flowing through the flow path and a controller configured to provide an actuator control signal responsive to a mass-flow-rate signal from the mass flow meter. The mass flow controller may further comprise an actuator configured to move in response to the actuator control signal. The actuator may be realized, for example, by a piezoelectric, solenoid, or other actuator known in the art. The mass flow controller may further comprise a diaphragm assembly configured so at least a portion of the diaphragm assembly moveably extends and retracts within the control valve cavity, which may enable for control of the gas flow through the flow path. The diaphragm assembly may comprise an aperture, side walls extending from the aperture and disposed about a central axis, the side walls including multiple convolutions, and a poppet including an interior surface facing the aperture and an exterior sealing surface facing the inlet port. The side walls with multiple convolutions may also be referred to as bellows. Such a unique diaphragm assembly design, herein referred to as a "bellows diaphragm assembly" (or more simply as a "diaphragm assembly") may enable larger deflections at smaller diameters than conventional diaphragm assemblies. The mass flow controller may further comprise a push rod extending from the interior surface of the poppet, along the central axis, through the aperture to enable the push rod to couple to the actuator, wherein the push rod moves, responsive to motion of the actuator, along the central axis to enable the exterior sealing surface of the poppet to open and close the flow path through the control valve cavity, providing a means for opening and closing the flow path through the control valve cavity.

In some embodiments, the diaphragm assembly may include a flanged top surface, wherein the flanged top surface is configured to seal the control valve cavity, enabling pressure in the flow path to be controlled and maintained. Additionally, the seal provided by the flanged top surface may enable the push rod and other mass flow controller components to be protected from exposure to the gas within the flow path, potentially preventing corrosion or other gas-related degradation. Thus, the flanged top surface may provide a means for sealing the control valve cavity apart from the actuator, and bellows may be coupled between the means for sealing, such as the flanged top surface, and the means for opening and closing the flow path through the control valve cavity, such as the exterior sealing surface of the poppet. Each of the flanged top surface and the poppet may be formed as an integrated piece with the side walls of the diaphragm assembly or, alternatively, be a machined piece that is coupled to the side walls of the diaphragm assembly, such as through welding, with the flanged top surface being coupled proximate to the aperture and the poppet being coupled to the end opposing the aperture.

In some embodiments, the interior surface of the poppet may include a recess, such as a conical notch, configured to receive the push rod. Such a recess may enable a potential increase in reliability of the mass flow controller by preventing lateral movements of the push rod that may disrupt proper valve closure.

In other embodiments, the push rod may be integrated with the interior surface of the poppet, so as to be formed into one part. The integration of the push rod may enable a potential increase in reliability by preventing lateral push rod movement, as with the poppet recess mentioned above, and may also enable a more simplified, robust construction by reducing the number of parts, potentially limiting error propagation associated with the combination of separately manufactured parts.

In some embodiments, the convolutions, or bellows, of the diaphragm assembly may be configured to deform along the central axis of the diaphragm assembly and exert a restoring force when deformed. This restoring force may secure the poppet in a default, resting position when not perturbed by other forces, such as via the push rod. As a result, the diaphragm assembly itself may function as a spring within the mass flow controller, enabling the mass flow controller to operate without additional springs conventionally associated with control valves. The spring-like functionality of the diaphragm assembly may also be utilized in some embodiments to work in concert with one or more springs associated with a control valve to enable a variety of configurations with improved functionality, such as a configuration with a spring and the diaphragm assembly exerting opposing restoring forces to increase the tendency for the diaphragm assembly to return to a default, resting position. The wall thickness, tortuosity, and geometry of the convolutions may be altered to achieve a particular effective spring rate. The restoring force of the diaphragm assembly may be utilized, for example, as a compressive or expansive spring force depending on the application and mass flow controller design.

In some embodiments, the exterior sealing surface of the poppet may be positioned in a default, resting position so the flow path through the control valve cavity is normally opened. For example, the resting position of the exterior sealing surface of the poppet may be in a retracted state, leaving an uninhibited flow path between the inlet and outlet ports of the control valve cavity. The push rod may push the poppet into an extended state, causing the exterior sealing surface of the poppet to inhibit the flow path between the inlet and outlet ports of the control valve cavity. The exterior sealing surface of the poppet may return to the default, resting position as the force from the push rod diminishes to normal levels, returning the flow path through the control valve cavity to its normally opened state.

In other embodiments, the exterior sealing surface of the poppet may be positioned in a default, resting position so the flow path through the control valve cavity is normally closed. For example, the resting position of the exterior sealing surface of the poppet may be in an extended state, inhibiting the flow path between the inlet and outlet ports of the control valve cavity. The force applied by the push rod to the poppet may be reduced, which may cause the exterior sealing surface of the poppet to retract and leave an uninhibited flow path between the inlet and outlet ports of the control valve cavity. The exterior sealing surface of the poppet may extend and return to the default, resting position as the force from the push rod increases to normal levels, returning the flow path through the control valve cavity to its normally closed, inhibited state.

Referring now to the drawings, FIG. 1 illustrates a cross-sectional view of an exemplary embodiment of a mass flow controller 100 with a diaphragm assembly 130. The mass flow controller 100 may have a flow path that receives a gas through a mass flow controller inlet port 102 and funnels the gas into a bypass portion 104 of the mass flow controller with some of the gas being shunted into a mass flow meter 106 and later rejoining the main flow path of the gas downstream. The gas may continue along the flow path through a bypass portion outlet port 108 to a control valve cavity inlet port 109 and into a control valve cavity 110 if the flow path through the control valve cavity 110 is in an open, uninhibited state. The gas may then proceed along the flow path through a control valve cavity outlet port 111 and exit the mass flow controller through a mass flow controller outlet port 112.

The flow of gas along the flow path may be regulated using a control valve assembly of the mass flow controller, which may comprise an actuator 114, a motion booster assembly 116, a push rod 118, a clamping block 120, and the diaphragm assembly 130. The control valve assembly may be coupled to a mass flow controller baseplate 122. The mass flow meter 106 may be configured to measure a mass flow rate of the gas flowing through the flow path and emit a mass-flow-rate signal 125 based on the mass flow rate of the gas. A controller 126 of the mass flow controller may be configured to provide an actuator control signal 127 to the actuator 114 based on and responsive to the mass-flow-rate signal 125 from the mass flow meter 106. A mass-flow-rate setpoint 128 may be conveyed to the controller 126 via a mass-flow-rate setpoint signal 129, and the controller 126 may compare the mass-flow-rate signal 125 to the mass-flow-rate setpoint signal 129 to determine and send an appropriate actuator control signal 127 to the actuator 114. The actuator 114 may be configured to move in response to the actuator control signal 127 and may be realized, for example, by a piezoelectric, solenoid, or other actuator known in the art. The actuator 114 may interface with a motion booster assembly 116, which may magnify and convey the motion of the actuator 114 to the push rod 118. The push rod 118 may interface with the diaphragm assembly 130 to provide a force that may cause the diaphragm assembly 130 to extend from a retracted, normally open state.

Figure 2:
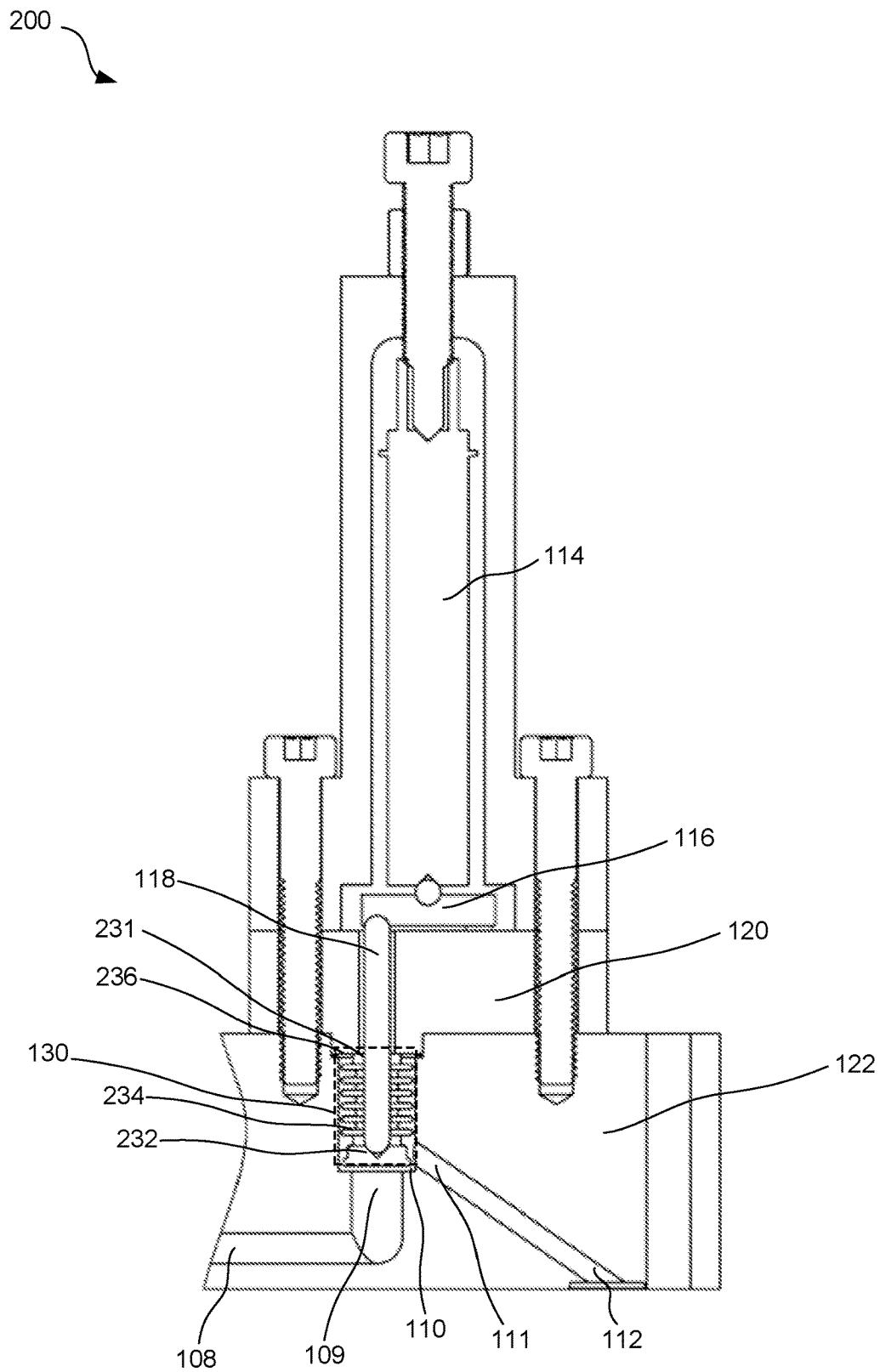
FIG. 2 illustrates a magnified cross-sectional view of the normally open control valve assembly of the mass flow controller of the FIG. 1 with the diaphragm assembly having a formed flanged top surface.

FIG. 2 illustrates a magnified cross-sectional view of the normally open control valve assembly 200 of the mass flow controller 100 of the FIG. 1 exemplary embodiment with the diaphragm assembly 130 having a flanged top surface 236, which may be formed as an integrated piece. The diaphragm assembly 130 may comprise an aperture 231, side walls 234 extending downward from the aperture 231 and disposed about a central axis, the side walls 234 including multiple convolutions, forming bellows, and a poppet 232 including an interior surface facing the aperture 231 and an exterior sealing surface facing the control valve cavity inlet port 109. The diaphragm assembly 130 may be configured so at least a portion of the diaphragm assembly 130 moveably extends and retracts within the control valve cavity 110, which may enable for control of the gas flow through the flow path. The diaphragm assembly 130 design may enable larger deflections at smaller diameters than conventional metal-sheet diaphragm assemblies. The push rod 118 may extend from the interior surface of the poppet 232, along the central axis, through the aperture 231 to enable the push rod 118 to couple to the actuator 114 via the motion booster assembly 116, which may magnify and convey the motion of the actuator 114 to the push rod 118 through a hinge-like mechanism. The actuator 114 and the push rod 118 may interface with the motion booster assembly 116 with rounded surfaces that allow the motion booster assembly 116 to pivot without generating undue stress along such interfaces. The push rod 118 may move, responsive to motion of the actuator 114, along the central axis to enable the exterior sealing surface of the poppet 232 to open and close the flow path through the control valve cavity 110, providing a means for opening and closing the flow path through the control valve cavity 110.

The diaphragm assembly 130 may include a flanged top surface 236, wherein the flanged top surface 236 is configured to seal the control valve cavity 110, enabling pressure in the flow path to be controlled and maintained. Additionally, the seal provided by the flanged top surface 236 may enable the push rod 118 and other mass flow controller components to be protected from exposure to the gas within the flow path, potentially preventing corrosion or other gas-related degradation. Thus, the flanged top surface 236 may provide a means for sealing the control valve cavity 110 apart from the actuator 114 as well as the motion booster assembly 116. The side walls 234, or bellows, may be coupled between the means for sealing, such as the flanged top surface 236, and the means for opening and closing the flow path through the control valve cavity, such as the exterior sealing surface of the poppet 232. The flanged top surface 236 shown is formed as an integrated piece with the side walls 234 proximate to the aperture 231, while the poppet 232 may be a separate piece, such as a machined part, that is coupled to the side walls 234 on the end opposing the aperture 231, such as through welding. The interior surface of the poppet 232 may include a recess, such as a conical notch, configured to receive the push rod 118 that may have rounded ends. Such a recess may enable a potential increase in reliability of the mass flow controller by preventing lateral movements of the push rod 118 that may disrupt proper valve closure. However, other embodiments may potentially feature a variety of push rod geometries, for example a push rod with flat ends, that may interface directly with a poppet without a recess.

The diaphragm assembly 130 may be seated within the control valve cavity 110 and may be secured in place between the clamping block 120 and the mass flow controller baseplate 122. The flanged top surface 236 of the diaphragm assembly 130 may be seated within an orifice of the mass flow controller baseplate 122 and held in place by a protrusion of the clamping block 120 that extends into the orifice and presses the flanged top surface 236 into a lip within the orifice securing the seal of the control valve cavity 110. An O-ring, such as a metal O-ring, may be disposed between the clamping block 120 and the mass flow controller baseplate 122 within the orifice. The clamping block 120 may include a recess configured to receive the push rod 118 and may be coupled to the mass flow controller baseplate 122 via, for example, screws or other fasteners.

The convolutions of the side walls 234, or bellows, of the diaphragm assembly 130 may be configured to deform along the central axis of the diaphragm assembly 130 and exert a restoring force when deformed. This restoring force may bias the poppet 232 to a normally open, resting position when not perturbed by other forces, such as via the push rod 118. As a result, the diaphragm assembly 130 itself may function as a spring within the mass flow controller 100, enabling the mass flow controller 100 to operate without additional springs conventionally associated with control valves. The wall thickness, tortuosity, and geometry of the convolutions of the side walls 234 may be altered to achieve a particular effective spring rate.

The resting position of the exterior sealing surface of the poppet 232 may be positioned in a normally open, retracted state so the flow path through the control valve cavity 110, between the control valve cavity inlet port 109 and the control valve cavity outlet port 111, is normally opened and uninhibited; however, the diaphragm assembly 130 is shown in an extended, closed state that is not open, resting position. The push rod 118 may push the poppet 232 into such an extended state, causing the exterior sealing surface of the poppet 232 to inhibit the flow path between the control valve cavity inlet port 109 and the control valve cavity outlet port 111. In some instances, the exterior sealing surface of the poppet 232 may fully extend to interface with the control valve cavity inlet port 109 and prevent any flow through the control valve cavity 110. The exterior sealing surface of the poppet 232 may return to the normally open, resting position as the force provided by the push rod 118 diminishes to normal, resting levels, allowing the restoring force of the diaphragm assembly 130 to retract the exterior sealing surface of the poppet 232 and return the flow path through the control valve cavity 110 to its normally opened state. The flow of the gas through the mass flow controller 100 may be regulated by controlling this extending and retracting of the diaphragm assembly 130 via the actuator 114.

Figure 3:
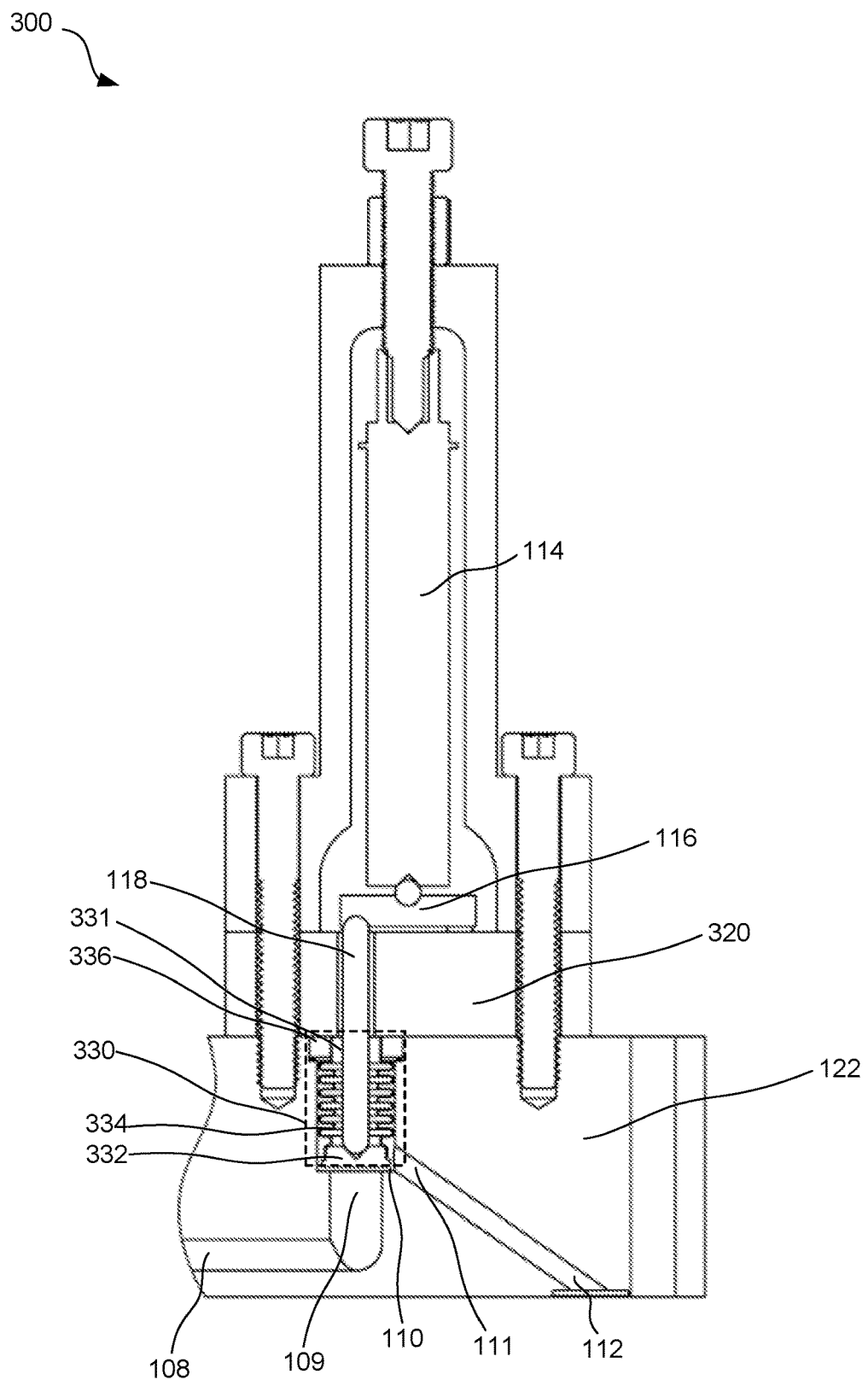
FIG. 3 illustrates a cross-sectional view of an exemplary embodiment of a normally open control valve assembly of a mass flow controller with a diaphragm assembly having a separately-coupled flanged top surface.

Referring now to FIG. 3, illustrated is a cross-sectional view of an exemplary embodiment of a normally open control valve assembly 300 of a mass flow controller with a diaphragm assembly 330 having a separately-coupled flanged top surface 336. The control valve assembly 300 of FIG. 3 is substantively the same as the control valve assembly 200 depicted in FIG. 2, except for features of the flanged top surface 336 of the diaphragm assembly 330 and the clamping block 320. In particular, each of the flanged top surface 336 and the poppet 332 of the diaphragm assembly 330 is a separate piece, such as a machined part, that is coupled to the side walls 334 of the diaphragm assembly 330, such as through welding, with the flanged top surface 336 being positioned proximate to the aperture 331 and the poppet 332 being positioned on the end opposing the aperture 331. The resulting flanged top surface 336 has a greater thickness than the formed flanged top surface 236 of the FIG. 2 embodiment. As a result, the aperture 331 is slightly elongated in comparison to the aperture 231 of the FIG. 2 embodiment. Additionally, the clamping block 320 holds the thicker flanged top surface 336 in place by applying pressure with the flat bottom surface of the clamping block 320, rather than by applying pressure with a protrusion of the clamping block 120 as in the FIG. 2 embodiment, securing the seal of the control valve cavity 110. This sealing configuration of the flanged top surface 336 may enable pressure in the flow path to be controlled and maintained. Additionally, the seal provided by the flanged top surface 336 may enable the push rod 118 and other mass flow controller components to be protected from exposure to the gas within the flow path, potentially preventing corrosion or other gas-related degradation. Thus, the flanged top surface 336 may provide a means for sealing the control valve cavity 110 apart from the actuator 114 as well as the motion booster assembly 116. In all other respects, the FIG. 3 embodiment is identical to the FIG. 2 embodiment.

Figure 4:
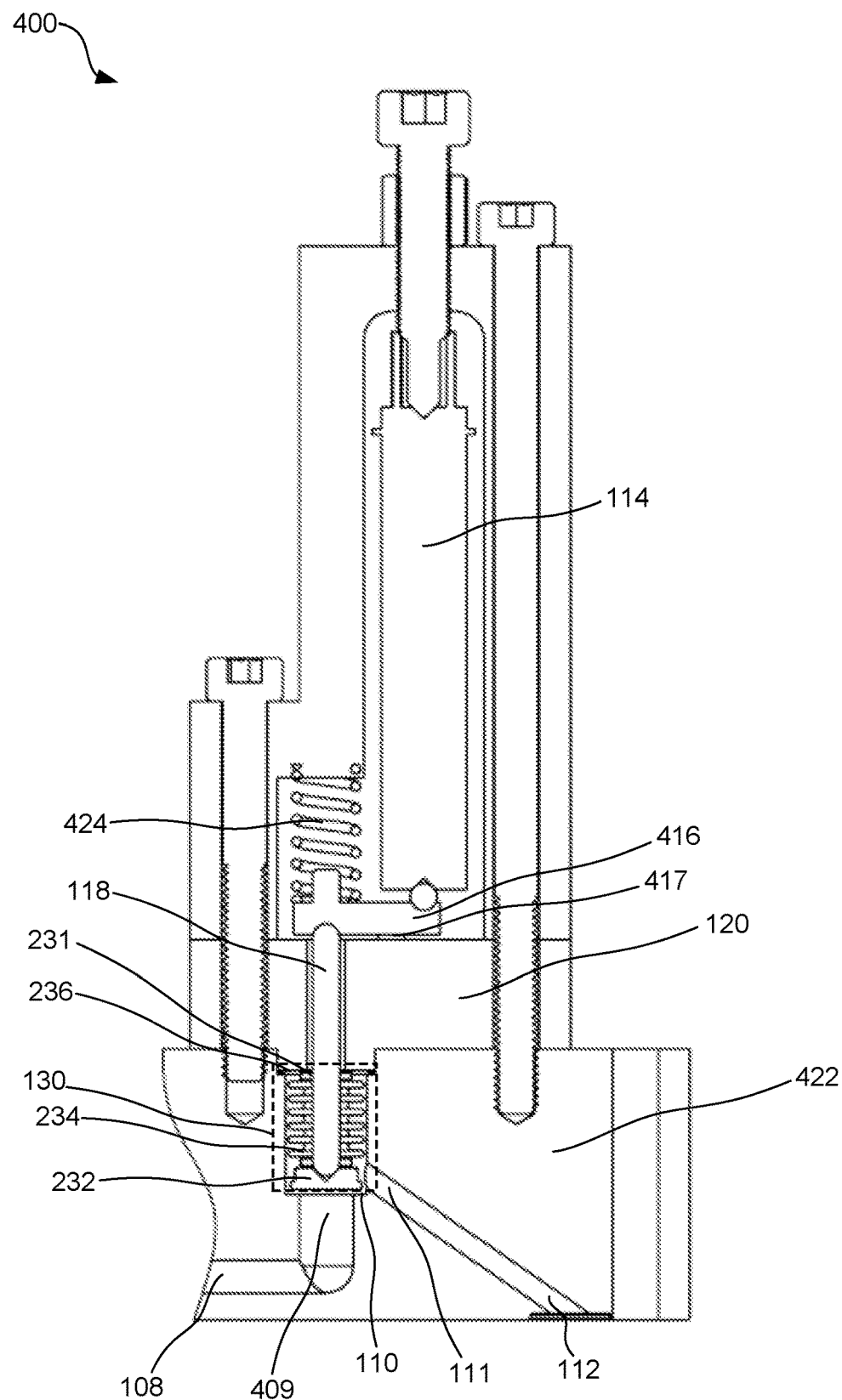
FIG. 4 illustrates a cross-sectional view of an exemplary embodiment of a normally closed control valve assembly of a mass flow controller with a diaphragm assembly and biasing spring.

Referring now to FIG. 4, illustrated is a cross-sectional view of an exemplary embodiment of a normally closed control valve assembly 400 of a mass flow controller with a diaphragm assembly 130 and a biasing spring 424. The control valve assembly 400 of FIG. 4 is predominantly the same as the control valve assembly 200 depicted in FIG. 2, except for the normally closed positioning of the control valve assembly 400, which is achieved with a different motion booster assembly 416 design with the associated biasing spring 424, and a slightly different control valve cavity inlet port 409 contained within the mass flow controller baseplate 422. The control valve cavity inlet port 409 is generally identical to the control valve cavity inlet port 109 depicted in the FIG. 2 embodiment except that the control valve inlet port features an additional ridge proximate the bypass portion outlet port 108. The control valve inlet port 409 can be either flat or have the additional ridge. The additional ridge is a different way to make a sealing surface. The additional ridge increases a pressure between the poppet and control valve inlet port by reducing a contact area.

The motion booster assembly 416 may interface with the push rod 118 and actuator 114 on opposing sides of a fulcrum 417 to enable the movement of the actuator 114 to be magnified and conveyed to the push rod 118 through a lever-like mechanism, altering the force applied by the push rod 118 to the poppet 232. For example, if the actuator 114 were to extend or move downwards and apply a force to the motion booster assembly 416 on the right side of the fulcrum 417, the force applied to the push rod 118 via the motion booster assembly 416 would be reduced as the motion booster assembly 416 portion on the left side of the fulcrum 417 would pivot upwards, allowing the push rod 118 to move upwards along the central axis of the diaphragm assembly 130. The push rod 118 may move, responsive to motion of the actuator 114, along the central axis of the diaphragm assembly 130 to enable the exterior sealing surface of the poppet 232 to open and close the flow path through the control valve cavity 110, providing a means for opening and closing the flow path through the control valve cavity 110.

The motion booster assembly 416 may interface with the biasing spring 424 positioned to the left of the fulcrum 417 proximate the push rod 118. The motion booster assembly 416 may have a protrusion extending upward into the center recess of the biasing spring 424, which may enable the biasing spring 424 to maintain its positioning over time during operation. The biasing spring 424 may attach to a wall of the control valve assembly 400 on an end opposing the motion booster assembly 416 and may exert a restoring force on a top surface of the motion booster assembly 416 when deformed. For example, the biasing spring 424 may bias the exterior sealing surface of the poppet 232 towards a normally closed, extended resting state by applying a downward force to the motion booster assembly 416 when compressed as the exterior sealing surface of the poppet 232 retracts from the extended resting state. The force applied by the biasing spring 424 may be transferred to the poppet 232 via the push rod 118 and the motion booster assembly 416. The actuator 114 may counteract the force applied by the biasing spring 424 through the motion booster assembly 416 to retract the exterior sealing surface of the poppet 232 and open the normally closed flow path through the control valve cavity 110. Additionally, the spring-like functionality of the diaphragm assembly 130 may also be utilized to work in concert with the biasing spring 424 associated with the motion booster assembly 416, such as in a configuration with the biasing spring 424 and the diaphragm assembly 130 exerting opposing restoring forces enabling an increase in the tendency for the diaphragm assembly 130 and exterior sealing surface of the poppet 232 to return to a default, resting position. Alternatively, the biasing spring 424 and diaphragm assembly 130 may be configured to exert non-opposing restoring forces enabling a decrease in the load applied to both the biasing spring 424 and diaphragm assembly 130, potentially extending the lifetime of both parts.

The resting position of the exterior sealing surface of the poppet 232 may be positioned in a normally closed, extended state so the flow path through the control valve cavity 110, between the control valve cavity inlet port 409 and the control valve cavity outlet port 111, is normally closed and inhibited as shown. In some instances, the exterior sealing surface of the poppet 232 may fully extend to interface with the control valve cavity inlet port 409 and prevent any flow through the control valve cavity 110. The force applied by the push rod 118 to the poppet 232 may be reduced, such as through motion of the actuator 114 conveyed to the push rod 118 via the motion booster assembly 416, which may cause the exterior sealing surface of the poppet 232 to retract and leave an uninhibited flow path between the control valve cavity inlet port 409 and the control valve cavity outlet port 111. The exterior sealing surface of the poppet 232 may extend and return to the normally closed, resting position as the force provided by the push rod 118 increases to normal, resting levels, such as when the force applied to the motion booster assembly 416 by the actuator 114 is reduced as the actuator 114 moves or retracts upward, allowing the restoring force of at least one of the biasing spring 424 and the diaphragm assembly 130 to cause the exterior sealing surface of the poppet 232 to extend and return the flow path through the control valve cavity 110 to its normally closed, inhibited state. The flow of the gas may be regulated by controlling this extending and retracting of the diaphragm assembly 130 via the actuator 114.

Figure 5:
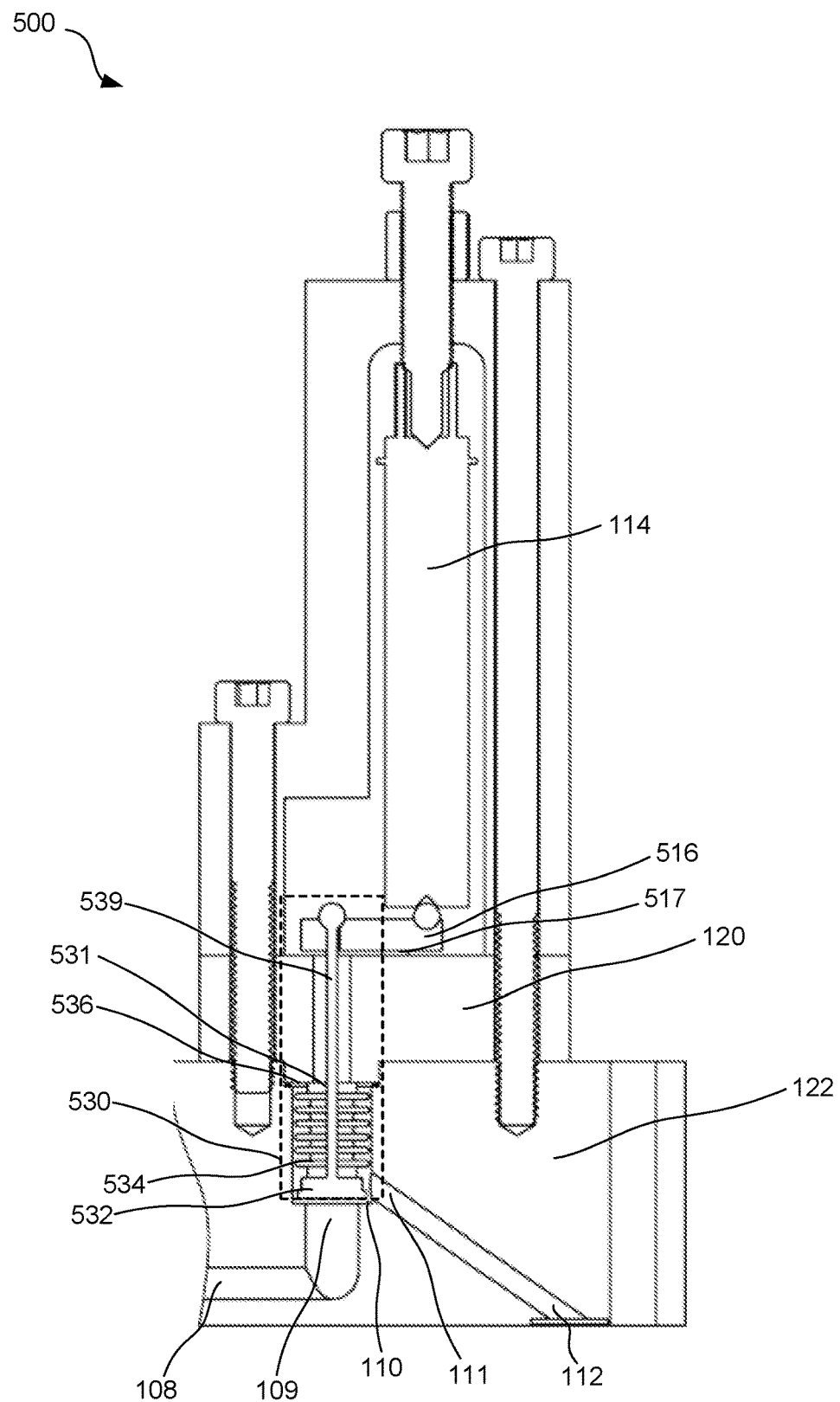
FIG. 5 illustrates a cross-sectional view of an exemplary embodiment of a normally closed control valve assembly of a mass flow controller with a diaphragm assembly having an integrated push rod.

Referring now to FIG. 5, illustrated is a cross-sectional view of an exemplary embodiment of a normally closed control valve assembly 500 of a mass flow controller with a diaphragm assembly 530 having an integrated push rod 539. The control valve assembly 500 of FIG. 5 is predominantly the same as the control valve assembly 400 depicted in FIG. 4, except for the diaphragm assembly 530 having an integrated push rod 539, a slightly different motion booster assembly 516 design, the lack of a biasing spring, and the control valve cavity inlet port 109 being identical to the control valve cavity inlet port 109 depicted in the FIG. 2 embodiment.

The diaphragm assembly 530 may have an integrated push rod 539 integrated with the interior surface of the poppet 532, so as to be formed into one part. As with the push rods of previously described embodiments, the integrated push rod 539 may extend from the interior surface of the poppet 532, along a central axis of the diaphragm assembly 530, between the side walls 534 and through the aperture 531, with the proximate flanged top surface 536, to enable the integrated push rod 539 to couple to the actuator 114 via the motion booster assembly 516, which may magnify and convey the motion of the actuator 114 to the integrated push rod 539 through a lever-like mechanism. The integrated push rod 539 may move, responsive to motion of the actuator 114, along the central axis of the diaphragm assembly 530 to enable the exterior sealing surface of the poppet 532 to open and close the flow path through the control valve cavity 110, providing a means for opening and closing the flow path through the control valve cavity 110. The integration of the integrated push rod 539 may enable a potential increase in reliability by preventing lateral push rod movement and may also enable a more simplified, robust construction by reducing the number of parts, potentially limiting error propagation associated with the combination of separately manufactured parts.

The motion booster assembly 516 may interface with the integrated push rod 539 and actuator 114 on opposing sides of a fulcrum 517 to enable the movement of the actuator 114 to be magnified and conveyed to the integrated push rod 539 through a lever-like mechanism, altering the force applied by the integrated push rod 539 to the poppet 532. For example, if the actuator 114 were to extend or move downwards and apply a force to the motion booster assembly 516 on the right side of the fulcrum 517, an upwards force would be applied to the integrated push rod 539 via the motion booster assembly 516 as the motion booster assembly 516 portion on the left side of the fulcrum 517 would pivot upwards, causing the integrated push rod 539 to move upwards and pull the attached poppet 532 upwards as well.

The motion booster assembly 516 may receive a spherical protrusion on the end of the integrated push rod 539 in an upwards-facing socket positioned to the left of the fulcrum 517. The diaphragm assembly 530 may act as a spring and exert a restoring force conveyed via the integrated push rod 539 to the upwards-facing socket of the motion booster assembly 516 when deformed, enabling the control valve assembly 500 to function with fewer required parts. For example, the diaphragm assembly 530 may bias the exterior sealing surface of the poppet 532 towards a normally closed, extended resting state by applying an expansive force when compressed from the resting state, which may apply a downward force to the motion booster assembly 516 as the exterior sealing surface of the poppet 532 retracts from the extended resting state. The actuator 114 may counteract the force applied by the diaphragm assembly 530 to the motion booster assembly 516 to retract the exterior sealing surface of the poppet 532, as mentioned above, and open the normally closed flow path through the control valve cavity 110. As a consequence, the integrated push rod 539 may move, responsive to motion of the actuator 114, along the central axis of the diaphragm assembly 530 to enable the exterior sealing surface of the poppet 532 to open and close the flow path through the control valve cavity 110, providing a means for opening and closing the flow path through the control valve cavity 110.

The resting position of the exterior sealing surface of the poppet 532 may be positioned in a normally closed, extended state so the flow path through the control valve cavity 110, between the control valve cavity inlet port 109 and the control valve cavity outlet port 111, is normally closed and inhibited as shown. In some instances, the exterior sealing surface of the poppet 532 may fully extend to interface with the control valve cavity inlet port 109 and prevent any flow through the control valve cavity 110. An upward, pulling force applied by the push rod 539 to the poppet 532 may be increased, such as through motion of the actuator 114 conveyed to the push rod 539 via the motion booster assembly 516, which may cause the exterior sealing surface of the poppet 532 to retract and leave an uninhibited flow path between the control valve cavity inlet port 109 and the control valve cavity outlet port 111. The exterior sealing surface of the poppet 532 may extend and return to the normally closed, resting position as the upward, pulling force provided by the integrated push rod 539 decreases to normal, resting levels, such as when the force applied to the motion booster assembly 516 by the actuator 114 is reduced as the actuator 114 moves or retracts upward, allowing the restoring force of the diaphragm assembly 530 to cause the exterior sealing surface of the poppet 532 to extend and return the flow path through the control valve cavity 110 to its normally closed, inhibited state. The flow of the gas may be regulated by controlling this extending and retracting of the diaphragm assembly 530 via the actuator 114.

Figure 6:
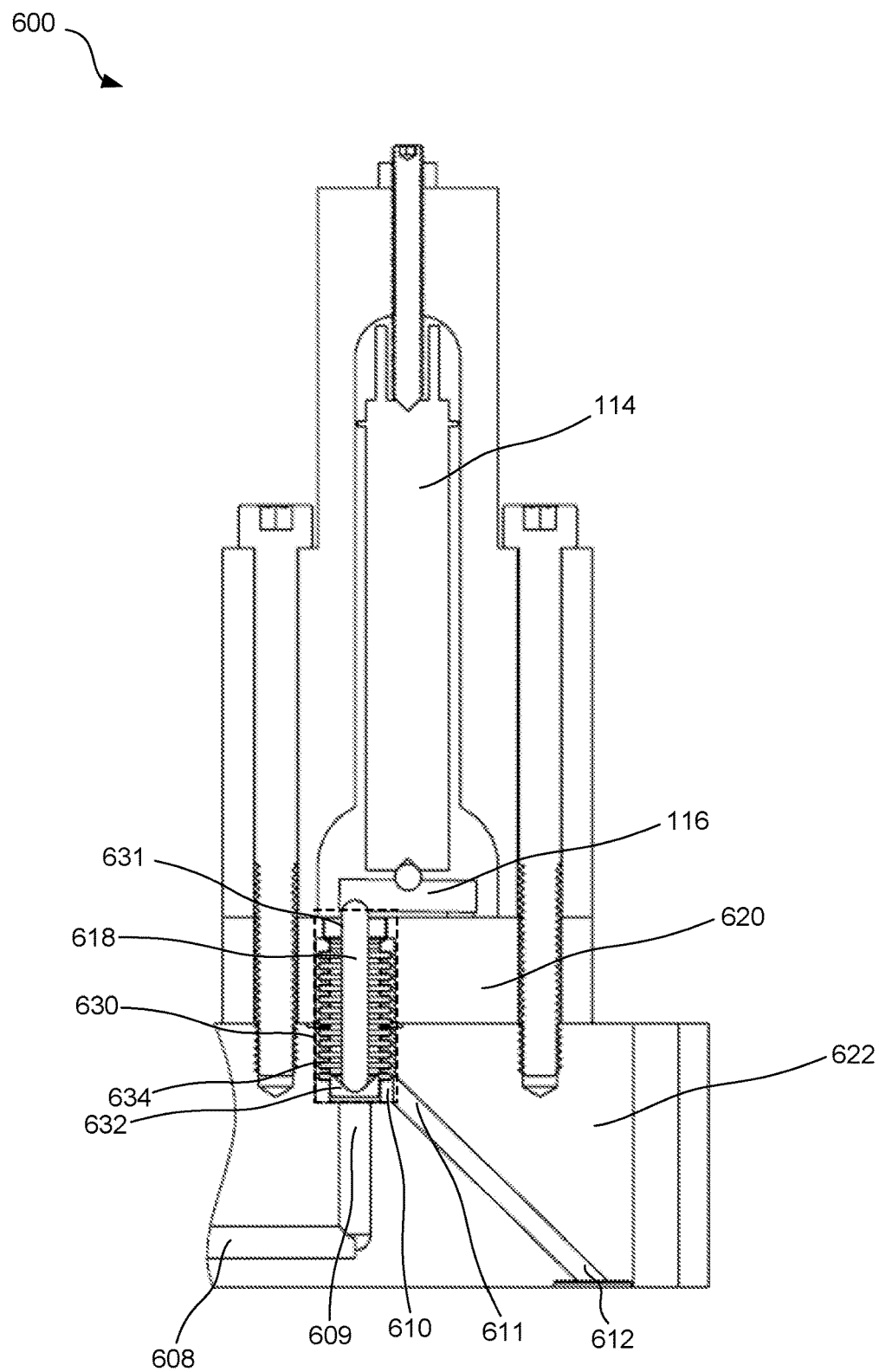
FIG. 6 illustrates a cross-sectional view of an exemplary embodiment of a normally open control valve assembly of a mass flow controller with a diaphragm assembly integrated with a clamping block and having a formed poppet.

Referring now to FIG. 6, illustrated is a cross-sectional view of an exemplary embodiment of a normally open control valve assembly 600 of a mass flow controller with a diaphragm assembly 630 integrated with a clamping block 620 and having a formed poppet 632. The control valve assembly 600 may couple to a mass flow controller baseplate 622, which may have a flow path that allows a gas to pass from the bypass portion outlet port 608 to a control valve cavity inlet port 609 and into a control valve cavity 610 if the flow path through the control valve cavity 610 is in an open, uninhibited state. The gas may then proceed along the flow path through a control valve cavity outlet port 611 and exit the mass flow controller through a mass flow controller outlet port 612.

The diaphragm assembly 630 may comprise an aperture 631, side walls 634 extending downward from the aperture 631 and disposed about a central axis, the side walls 634 including multiple convolutions, forming bellows, and a poppet 632 including an interior surface facing the aperture 631 and an exterior sealing surface facing the control valve cavity inlet port 609. The diaphragm assembly 630 may be configured so at least a portion of the diaphragm assembly 630 moveably extends and retracts within the control valve cavity 610, which may enable for control of the gas flow through the flow path. The diaphragm assembly 630 design may enable larger deflections at smaller diameters than conventional metal-sheet diaphragm assemblies. The actuator 114 and motion booster assembly 116 depicted are the same as those of the FIG. 2 embodiment. The push rod 618 may extend from the interior surface of the poppet 632, along the central axis, through the aperture 631 to enable the push rod 618 to couple to the actuator 114 via the motion booster assembly 116, which may magnify and convey the motion of the actuator 114 to the push rod 618 through a hinge-like mechanism. The actuator 114 and the push rod 618 may interface with the motion booster assembly 116 with rounded surfaces that allow the motion booster assembly 116 to pivot without generating undue stress along such interfaces. The push rod 618 may move, responsive to motion of the actuator 114, along the central axis to enable the exterior sealing surface of the poppet 632 to open and close the flow path through the control valve cavity 610, providing a means for opening and closing the flow path through the control valve cavity 610.

The diaphragm assembly 630 may have a flanged top surface that is integrated into a clamping block 620 to form a single part, such as by welding, wherein the integration of the flanged top surface with the clamping block 620 is configured to seal the control valve cavity 610, enabling pressure in the flow path to be controlled and maintained. Additionally, the seal provided by the integration of the flanged top surface with the clamping block 620 may enable the push rod 618 and other mass flow controller components to be protected from exposure to the gas within the flow path, potentially preventing corrosion or other gas-related degradation. Thus, the integration of the flanged top surface with the clamping block 620 may provide a means for sealing the control valve cavity 610 apart from the actuator 114 as well as the motion booster assembly 116. The side walls 634, or bellows, may be coupled between the means for sealing, such as the integrated flanged top surface and clamping block 620, and the means for opening and closing the flow path through the control valve cavity, such as the exterior sealing surface of the poppet 632. The poppet 632 may be formed as an integrated piece with the side walls 634 of the diaphragm assembly 630 on the end opposing the aperture 631. The interior surface of the poppet 632 may include a recess, such as a wide indentation, configured to receive the push rod 618 that may have rounded ends. Such a recess may enable a potential increase in reliability of the mass flow controller by preventing lateral movements of the push rod 618 that may disrupt proper valve closure. However, other embodiments may potentially feature a variety of push rod geometries, for example a push rod with flat ends, that may interface directly with a poppet without a recess.

The diaphragm assembly 630 may be seated within the control valve cavity 610 and a recess of the clamping block 620 and may be secured in place through the integration of the flanged top surface with the clamping block 620 proximate the aperture 631 and a top surface of the clamping block 620. An O-ring, such as a metal O-ring, may be disposed between the clamping block 620 and the mass flow controller baseplate 622 within an orifice of the mass flow controller baseplate 622 proximate the side walls 634 of the diaphragm assembly 630. The clamping block 620 may be coupled to the mass flow controller baseplate 622 via, for example, screws or other fasteners.

The convolutions of the side walls 634, or bellows, of the diaphragm assembly 630 may be configured to deform along the central axis of the diaphragm assembly 630 and exert a restoring force when deformed. This restoring force may bias the poppet 632 to a normally open, resting position when not perturbed by other forces, such as via the push rod 618. As a result, the diaphragm assembly 630 itself may function as a biasing spring, enabling the control valve assembly 600 to operate without additional springs conventionally associated with control valves. The wall thickness, tortuosity, and geometry of the convolutions of the side walls 634 may be altered to achieve a particular effective spring rate.

The resting position of the exterior sealing surface of the poppet 632 may be positioned in a normally open, retracted state so the flow path through the control valve cavity 610, between the control valve cavity inlet port 609 and the control valve cavity outlet port 611, is normally opened and uninhibited; however, the diaphragm assembly 630 is shown in an extended, closed state that is not open, resting position. The push rod 618 may push the poppet 632 into such an extended state, causing the exterior sealing surface of the poppet 632 to inhibit the flow path between the control valve cavity inlet port 609 and the control valve cavity outlet port 611. In some instances, the exterior sealing surface of the poppet 632 may fully extend to interface with the control valve cavity inlet port 609 and prevent any flow through the control valve cavity 610. The exterior sealing surface of the poppet 632 may return to the normally open, resting position as the force provided by the push rod 618 diminishes to normal, resting levels, allowing the restoring force of the diaphragm assembly 630 to retract the exterior sealing surface of the poppet 632 and return the flow path through the control valve cavity 610 to its normally opened state. The flow of the gas may be regulated by the control valve assembly 600 controlling this extending and retracting of the diaphragm assembly 630 via the actuator 114.

Figure 7:
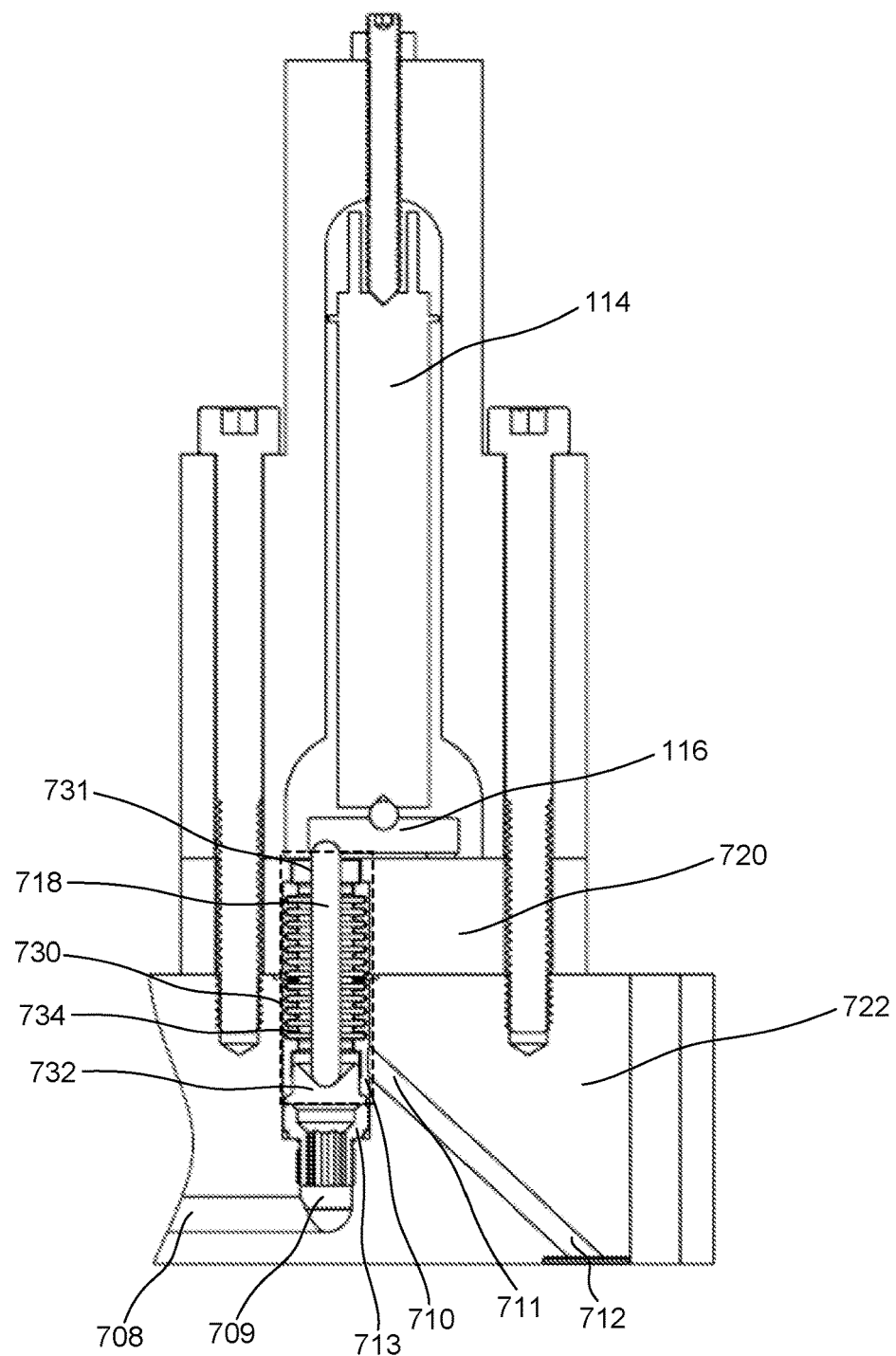
FIG. 7 illustrates a cross-sectional view of an exemplary embodiment of a normally open control valve assembly of a mass flow controller with a diaphragm assembly integrated with a clamping block and having a separately-coupled poppet.

Referring now to FIG. 7, illustrated is a cross-sectional view of an exemplary embodiment of a normally open control valve assembly 700 of a mass flow controller with a diaphragm assembly 730 integrated with a clamping block 720 and having a separately-coupled poppet 732. The control valve assembly 700 may couple to a mass flow controller baseplate 722, which may have a flow path that allows a gas to pass from the bypass portion outlet port 708 to a control valve cavity inlet port 709 through an orifice element 713 and into a control valve cavity 710 if the flow path through the control valve cavity 710 is in an open, uninhibited state. The orifice element 713 may enable for greater control of certain aspects of the flow into the control valve cavity 710, such as directionality, velocity, and turbulence during operation by providing structural geometries to influence flow. For example, the orifice element 713 may provide a narrower geometry to increase flow velocity into the control valve cavity 710. The gas may then proceed along the flow path through a control valve cavity outlet port 711 and exit the mass flow controller through a mass flow controller outlet port 712.

The diaphragm assembly 730 may comprise an aperture 731, side walls 734 extending downward from the aperture 731 and disposed about a central axis, the side walls 734 including multiple convolutions, forming bellows, and a poppet 732 including an interior surface facing the aperture 731 and an exterior sealing surface facing the control valve cavity inlet port 709. The diaphragm assembly 730 may be configured so at least a portion of the diaphragm assembly 730 moveably extends and retracts within the control valve cavity 710, which may enable for control of the gas flow through the flow path. The diaphragm assembly 730 design may enable larger deflections at smaller diameters than conventional metal-sheet diaphragm assemblies. The actuator 114 and motion booster assembly 116 depicted are the same as those of the FIG. 2 embodiment. The push rod 718 may extend from the interior surface of the poppet 732, along the central axis, through the aperture 731 to enable the push rod 718 to couple to the actuator 114 via the motion booster assembly 116, which may magnify and convey the motion of the actuator 114 to the push rod 718 through a hinge-like mechanism. The actuator 114 and the push rod 718 may interface with the motion booster assembly 116 with rounded surfaces that allow the motion booster assembly 116 to pivot without generating undue stress along such interfaces. The push rod 718 may move, responsive to motion of the actuator 114, along the central axis to enable the exterior sealing surface of the poppet 732 to open and close the flow path through the control valve cavity 710, providing a means for opening and closing the flow path through the control valve cavity 710.

The diaphragm assembly 730 may have a flanged top surface that is integrated into a clamping block 720 to form a single part, such as by welding, wherein the integration of the flanged top surface with the clamping block 720 is configured to seal the control valve cavity 710, enabling pressure in the flow path to be controlled and maintained. Additionally, the seal provided by the integration of the flanged top surface with the clamping block 720 may enable the push rod 718 and other mass flow controller components to be protected from exposure to the gas within the flow path, potentially preventing corrosion or other gas-related degradation. Thus, the integration of the flanged top surface with the clamping block 720 may provide a means for sealing the control valve cavity 710 apart from the actuator 114 as well as the motion booster assembly 116. The side walls 734, or bellows, may be coupled between the means for sealing, such as the integrated flanged top surface and clamping block 720, and the means for opening and closing the flow path through the control valve cavity, such as the exterior sealing surface of the poppet 732. The poppet 732 may be a separate piece, such as a machined part, that is coupled to the side walls 734 on the end opposing the aperture 731, such as through welding. The interior surface of the poppet 732 may include a recess, such as a wide indentation, configured to receive the push rod 718 that may have rounded ends. Such a recess may enable a potential increase in reliability of the mass flow controller by preventing lateral movements of the push rod 718 that may disrupt proper valve closure. However, other embodiments may potentially feature a variety of push rod geometries, for example a push rod with flat ends, that may interface directly with a poppet without a recess.

The diaphragm assembly 730 may be seated within the control valve cavity 710 and a recess of the clamping block 720 and may be secured in place through the integration of the flanged top surface with the clamping block 720 proximate the aperture 731 and a top surface of the clamping block 720. An O-ring, such as a metal O-ring, may be disposed between the clamping block 720 and the mass flow controller baseplate 722 within an orifice of the mass flow controller baseplate 722 proximate the side walls 734 of the diaphragm assembly 730. The clamping block 720 may be coupled to the mass flow controller baseplate 722 via, for example, screws or other fasteners.

The convolutions of the side walls 734, or bellows, of the diaphragm assembly 730 may be configured to deform along the central axis of the diaphragm assembly 730 and exert a restoring force when deformed. This restoring force may bias the poppet 732 to a normally open, resting position when not perturbed by other forces, such as via the push rod 718. As a result, the diaphragm assembly 730 itself may function as a biasing spring, enabling the control valve assembly 700 to operate without additional springs conventionally associated with control valves. The wall thickness, tortuosity, and geometry of the convolutions of the side walls 734 may be altered to achieve a particular effective spring rate.

The resting position of the exterior sealing surface of the poppet 732 may be positioned in a normally open, retracted state so the flow path through the control valve cavity 710, between the control valve cavity inlet port 709 and the control valve cavity outlet port 711, is normally opened and uninhibited; however, the diaphragm assembly 730 is shown in an extended, closed state that is not the normally open, resting position. The push rod 718 may push the poppet 732 into such an extended state, causing the exterior sealing surface of the poppet 732 to inhibit the flow path between the control valve cavity inlet port 709 and the control valve cavity outlet port 711. In some instances, the exterior sealing surface of the poppet 732 may fully extend to interface with the orifice element 713 disposed within the control valve cavity inlet port 709 and prevent any flow through the control valve cavity 610. The exterior sealing surface of the poppet 732 may return to the normally open, resting position as the force provided by the push rod 718 diminishes to normal, resting levels, allowing the restoring force of the diaphragm assembly 730 to retract the exterior sealing surface of the poppet 732 and return the flow path through the control valve cavity 710 to its normally opened state. The flow of the gas may be regulated by the control valve assembly 700 controlling this extending and retracting of the diaphragm assembly 730 via the actuator 114.

Figure 8B:
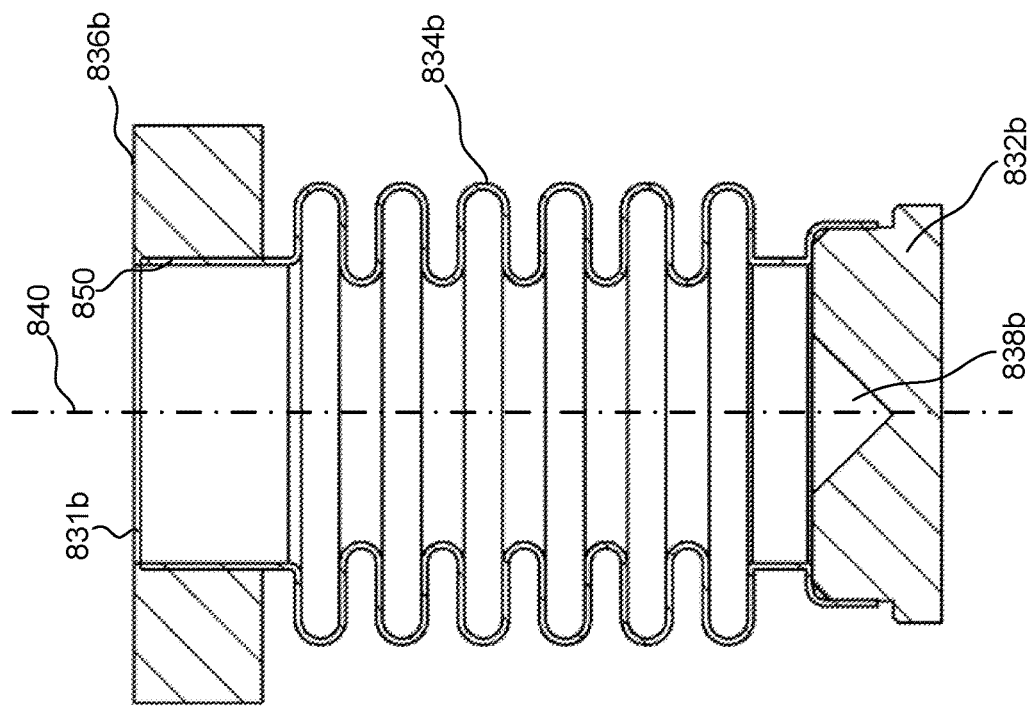
FIG. 8B illustrates a cross-sectional view of an exemplary embodiment of a diaphragm assembly having a separately-coupled flanged top surface.
Figure 8A:
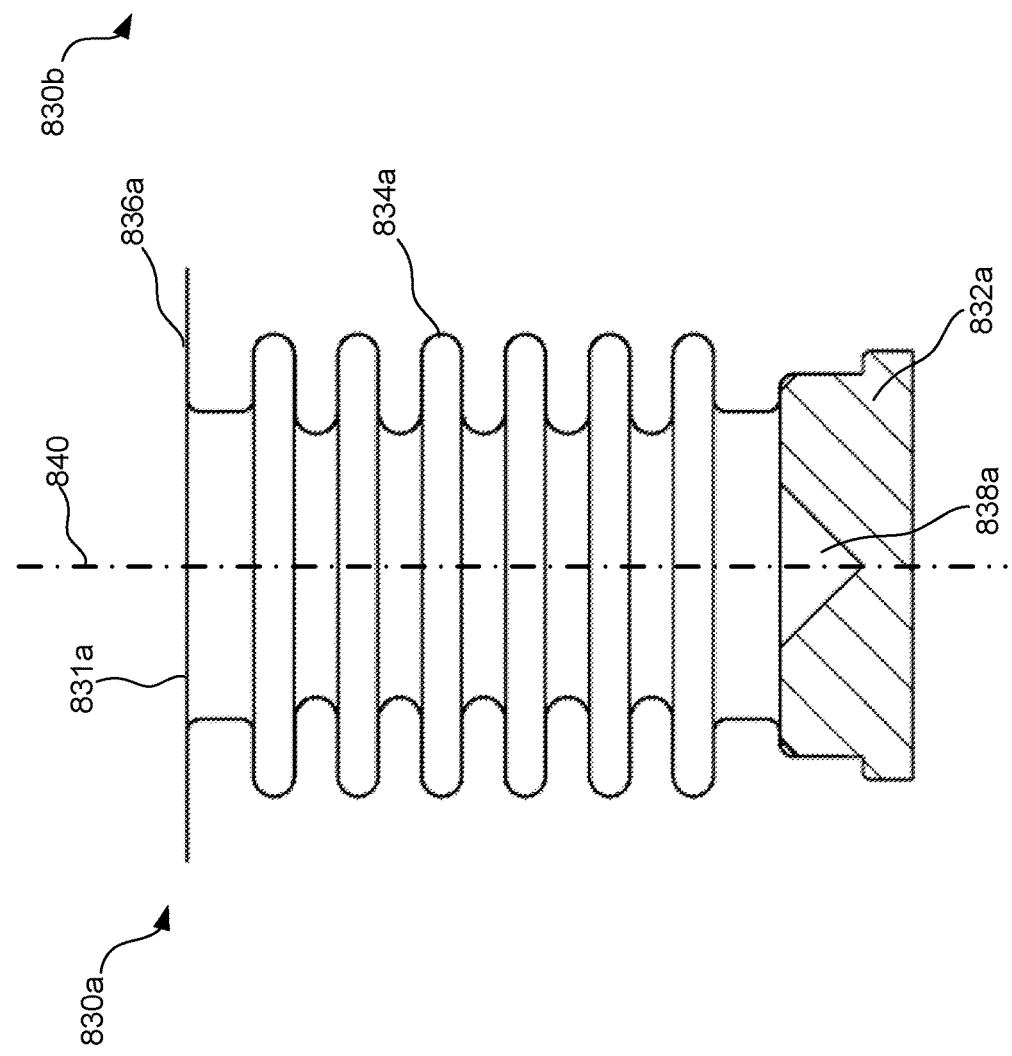
FIG. 8A illustrates a cross-sectional view of an exemplary embodiment of a diaphragm assembly having a formed flanged top surface.

Referring now to FIG. 8A, illustrated is a cross-sectional view of an exemplary embodiment of a diaphragm assembly 830a having a formed flanged top surface, such as in the diaphragm assembly 130 depicted in the embodiments of FIGS. 1, 2, and 4. The diaphragm assembly 830a may be roughly cylindrical and may comprise an aperture 831a, side walls 834a extending downward from the aperture 831a and disposed about a central axis 840, the side walls 834a including multiple convolutions, forming bellows, and a poppet 832a including an interior surface facing the aperture 831a and an exterior sealing surface, which may include a flange as depicted, configured to interact with a fluid within a flow path. The diaphragm assembly 830a may be configured to moveably extend and retract, for example with at least a portion of the diaphragm assembly 830a being disposed within a control valve cavity along the flow path of a mass flow controller, which may enable for control of the fluid flow through the flow path. The diaphragm assembly 830a design may enable larger deflections at smaller diameters than conventional metal-sheet diaphragm assemblies. The interior surface of the poppet 832a may include a recess 838a, such as the depicted conical notch, configured to receive a push rod that may have ends with a variety of geometries, such as rounded ends. Such a recess may enable a potential increase in reliability of a mass flow controller by preventing lateral movements of the push rod that may disrupt proper valve closure. The side walls 834a may surround the push rod received by the recess 838a, enabling the push rod to extend from the interior surface of the poppet 832a, along the central axis 840, and through the aperture 831a to potentially couple to an actuator. The push rod may move, responsive to motion of the actuator, along the central axis 840 to enable the exterior sealing surface of the poppet 832a to, for example, open and close a flow path through a control valve cavity, providing a means for opening and closing the flow path through the control valve cavity.

The diaphragm assembly 830a may have a flanged top surface 836a that extends laterally and may be configured to, for example, seal a control valve cavity, enabling pressure in a flow path of a mass flow controller to be controlled and maintained. Additionally, the sealing capabilities provided by the flanged top surface 836a may enable mass flow controller components, such as an actuator, motion booster assembly, push rod, or biasing spring, to be protected from exposure to the gas within the flow path, potentially preventing corrosion or other gas-related degradation. Thus, the flanged top surface 836a may provide a means for sealing a control valve cavity apart from an actuator as well as a motion booster assembly, and the side walls 834a, or bellows, may be coupled between the means for sealing, such as the flanged top surface 836a, and the means for opening and closing the flow path through a control valve cavity, such as the exterior sealing surface of the poppet 832a. The flanged top surface 836a shown may be formed as an integrated piece with the side walls 834a proximate to the aperture 831a, while the poppet 832a shown may be a separate piece, such as a machined part, that is coupled to the side walls 834a on the end opposing the aperture 831a, such as through welding. The flanged top surface 836a may provide a means for securing the diaphragm assembly 830a. For example, the diaphragm assembly 830a may be seated within a control valve cavity of a mass flow controller and the flanged top surface 836a may be pressed between a clamping block and a baseplate of the mass flow controller to secure the diaphragm assembly 830a in place.

The convolutions of the side walls 834a, or bellows, of the diaphragm assembly 830a may be configured to deform along the central axis 840 of the diaphragm assembly 830a and exert a restoring force when deformed. For example, this restoring force may bias the poppet 832a to a default, resting position when not perturbed by other forces, such as via a push rod. As a result, the diaphragm assembly 830a itself may function as a biasing spring within a control valve assembly, enabling for operation without additional springs conventionally associated with control valves. The wall thickness, tortuosity, and geometry of the convolutions of the side walls 834a may be altered to achieve a particular effective spring rate. The diaphragm assembly 830a may include non-brittle materials, such as metal, that may enable a greater restoring force when deformed and protect the diaphragm assembly 830a from fracturing.

Referring now to FIG. 8B, illustrated is a cross-sectional view of an exemplary embodiment of a diaphragm assembly 830b having a separately-coupled flanged top surface 836b, such as in the diaphragm assembly 330 depicted in the FIG. 3 embodiment. The diaphragm assembly 830b of FIG. 8B is substantively the same as the diaphragm assembly 830a depicted in FIG. 8A, except for the flanged top surface 836b and slightly thicker side walls 834b. As in the FIG. 8A embodiment, the diaphragm assembly 830b may be roughly cylindrical and may comprise an aperture 831b, side walls 834b extending downward from the aperture 831b and disposed about a central axis 840, the side walls 834b including multiple convolutions, forming bellows, and a poppet 832b including an interior surface facing the aperture 831b, which may include a recess 838b, and an exterior sealing surface, which may include a flange as depicted, configured to interact with a fluid within a flow path. In contrast to the FIG. 8A embodiment, each of the flanged top surface 836b and the poppet 832b of the diaphragm assembly 830b is a separate piece, such as a machined part, that is coupled to the side walls 834b of the diaphragm assembly 830b, such as through welding, with the flanged top surface 836b being positioned proximate to the aperture 831b and the poppet 832b being positioned on the end opposing the aperture 831b. The resulting flanged top surface 836b has a greater thickness than the formed flanged top surface 836a of the FIG. 8A embodiment. In addition, the side walls 834b include an elongated neck 850 that extends into the flanged top surface 836b.

The flanged top surfaces 836a and 836b are sealing surfaces, and as a consequence, the flanged top surfaces 836a and 836b may be sealed with a metal o-ring. The greater thickness of the flanged top surface 836b of FIG. 8B (in contrast to the flanged top surface 836a of FIG. 8A, which is thinner) is more capable of handling forces required to seal with the metal o-ring without deforming or damaging the flanged top surface 836b. The elongated neck 850 allows mating and welding of the flanged top surface 836b to the side walls 834b of the diaphragm assembly 830b.

In some instances, non-formed, separate pieces, such as the flanged top surface 836b and the poppet 832b, may enable more flexibility in manufacturing with replaceable, interchangeable components. For example, alternative designs of the poppet 832b may be produced and interchanged without altering the manufacturing process of the entire diaphragm assembly 830b, which may potentially reduce production costs.

Referring now to FIG. 9A, illustrated is a cross-sectional view of an exemplary embodiment of a diaphragm assembly 930a having an integrated push rod 939a and a formed flanged top surface 936a, such as in the diaphragm assembly 530 depicted in the FIG. 5 embodiment. The diaphragm assembly 930b of FIG. 9A is substantively the same as the diaphragm assembly 830a depicted in FIG. 8A, except for the diaphragm assembly 930a having an integrated push rod 939a and lacking the recess 838a of the FIG. 8A embodiment. As in the FIG. 8A embodiment, the diaphragm assembly 930a may be roughly cylindrical and may comprise an aperture 931a, side walls 934a extending downward from the aperture 931a and disposed about the central axis 840, the side walls 934a including multiple convolutions, forming bellows, and a poppet 932a including an interior surface facing the aperture 931a and an exterior sealing surface, which may include a flange as depicted, configured to interact with a fluid within a flow path.

In contrast to the FIG. 8A embodiment, the diaphragm assembly 930a may have an integrated push rod 939a integrated with the interior surface of the poppet 932a, so as to be formed into one part. As with the push rods of previously described embodiments, the integrated push rod 939a may extend from the interior surface of the poppet 932a, along the central axis 840 of the diaphragm assembly 930a, between the side walls 934a and through the aperture 931a, with the proximate flanged top surface 936a, to enable the integrated push rod 939a to potentially couple to an actuator. The top end of the integrated push rod 939a may include a spherical protrusion configured to interface with, for example, a motion booster assembly or actuator of a mass flow controller. The integrated push rod 939a may move, for example, responsive to motion of an actuator, along the central axis 840 of the diaphragm assembly 930a to enable the exterior sealing surface of the poppet 932a to open and close a flow path through a control valve cavity, providing a means for opening and closing the flow path through the control valve cavity. The integration of the integrated push rod 939a may enable a potential increase in reliability by preventing lateral push rod movement and may also enable a more simplified, robust construction by reducing the number of parts, potentially limiting error propagation associated with the combination of separately manufactured parts.

Referring now to FIG. 9B, illustrated is a cross-sectional view of an exemplary embodiment of a diaphragm assembly 930b having an integrated push rod 939b and a separately-coupled flanged top surface 936b. The diaphragm assembly 930b of FIG. 9B is substantively the same as the diaphragm assembly 930a depicted in FIG. 9A, except for the flanged top surface 936b and slightly thicker side walls 934b. As in the FIG. 9A embodiment, the diaphragm assembly 930b may be roughly cylindrical and may comprise an aperture 931b, side walls 934b extending downward from the aperture 931b and disposed about the central axis 840, the side walls 934b including multiple convolutions, forming bellows, and a poppet 932b including an interior surface facing the aperture 931b and an exterior sealing surface, which may include a flange as depicted, configured to interact with a fluid within a flow path. The diaphragm assembly 930b may have an integrated push rod 939b integrated with the interior surface of the poppet 932b, so as to be formed into one part with the poppet 932b. In contrast to the FIG. 9A embodiment, each of the flanged top surface 936b and the poppet 932b, with the integrated push rod 939b, of the diaphragm assembly 930b is a separate piece, such as a machined part, that is coupled to the side walls 934b of the diaphragm assembly 930b, such as through welding, with the flanged top surface 936b being positioned proximate to the aperture 931b and the poppet 932b being positioned on the end opposing the aperture 931b. The resulting flanged top surface 936b has a greater thickness than the formed flanged top surface 936a of the FIG. 9A embodiment. As a result, the aperture 931b is slightly elongated in comparison to the aperture 931a of the FIG. 9A embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mass flow controller, comprising:
   a flow path including a control valve cavity comprising a control valve cavity inlet port and a control valve cavity outlet port;
   a mass flow meter configured to measure a mass flow rate of a gas flowing through the flow path;
   a controller configured to provide an actuator control signal responsive to a mass-flow-rate signal from the mass flow meter;
   an actuator configured to move in response to the actuator control signal; and
   a diaphragm assembly configured so at least a portion of the diaphragm assembly moveably extends and retracts within the control valve cavity, the diaphragm assembly comprising:
   an aperture;
   side walls extending from the aperture and disposed about a central axis, the side walls including multiple convolutions configured to deform along the central axis and exert a restoring compressive or expansive spring force when deformed;
   a poppet including an interior surface facing the aperture and an exterior sealing surface facing the control valve cavity inlet port, wherein the restoring spring force biases the poppet to a default, resting position; and
   a push rod extending from the interior surface of the poppet, along the central axis, through the aperture to enable the push rod to couple to the actuator, wherein the push rod moves, responsive to motion of the actuator, along the central axis to enable the exterior sealing surface of the poppet to open and close the flow path through the control valve cavity.

2. The mass flow controller of claim 1, wherein the poppet is formed as an integrated piece with the side walls.

3. The mass flow controller of claim 1, wherein the poppet is a machined piece that is coupled to the side walls.

4. The mass flow controller of claim 1, wherein the interior surface of the poppet includes a recess configured to receive the push rod.

5. The mass flow controller of claim 1, wherein the push rod is integrated with the interior surface of the poppet.

6. The mass flow controller of claim 1, wherein the diaphragm assembly includes a flanged top surface, wherein the flanged top surface is configured to seal the control valve cavity.

7. The mass flow controller of claim 6, wherein the flanged top surface is integrated with the side walls.

8. The mass flow controller of claim 6, wherein the flanged top surface is a machined piece that is coupled to the side walls proximate to the aperture.

9. The mass flow controller of claim 1, comprising means for positioning the exterior sealing surface of the poppet so the flow path through the control valve cavity is normally open.

10. The mass flow controller of claim 1, comprising means for positioning the exterior sealing surface of the poppet so the flow path through the control valve cavity is normally closed.

11. A mass flow controller comprising:
a flow path including a control valve cavity comprising a control valve cavity inlet port and a control valve cavity outlet port;
a mass flow meter configured to measure a mass flow rate of a gas flowing through the flow path;
a controller configured to provide an actuator control signal responsive to a mass-flow-rate signal from the mass flow meter;
an actuator configured to move in response to the actuator control signal; and
a diaphragm assembly comprising:
means for sealing the control valve cavity apart from the actuator;
means for opening and closing the flow path through the control valve cavity;
bellows coupled between the means for sealing and the means for opening, the bellows configured to provide a restoring compressive or expansive spring force that biases the means for opening and closing to a resting position; and
a push rod coupling the diaphragm assembly to the actuator so the diaphragm assembly moves in response to the actuator.

12. The mass flow controller of claim 11 wherein the resting position is an open position.

13. The mass flow controller of claim 11 wherein the resting position is a closed position.

14. The mass flow controller of claim 11, wherein the means for opening and closing include a poppet with a recess configured to receive the push rod.

15. The mass flow controller of claim 11, wherein the means for opening and closing include a poppet that is integrally formed with the push rod.

* * * * *